Figure 1:
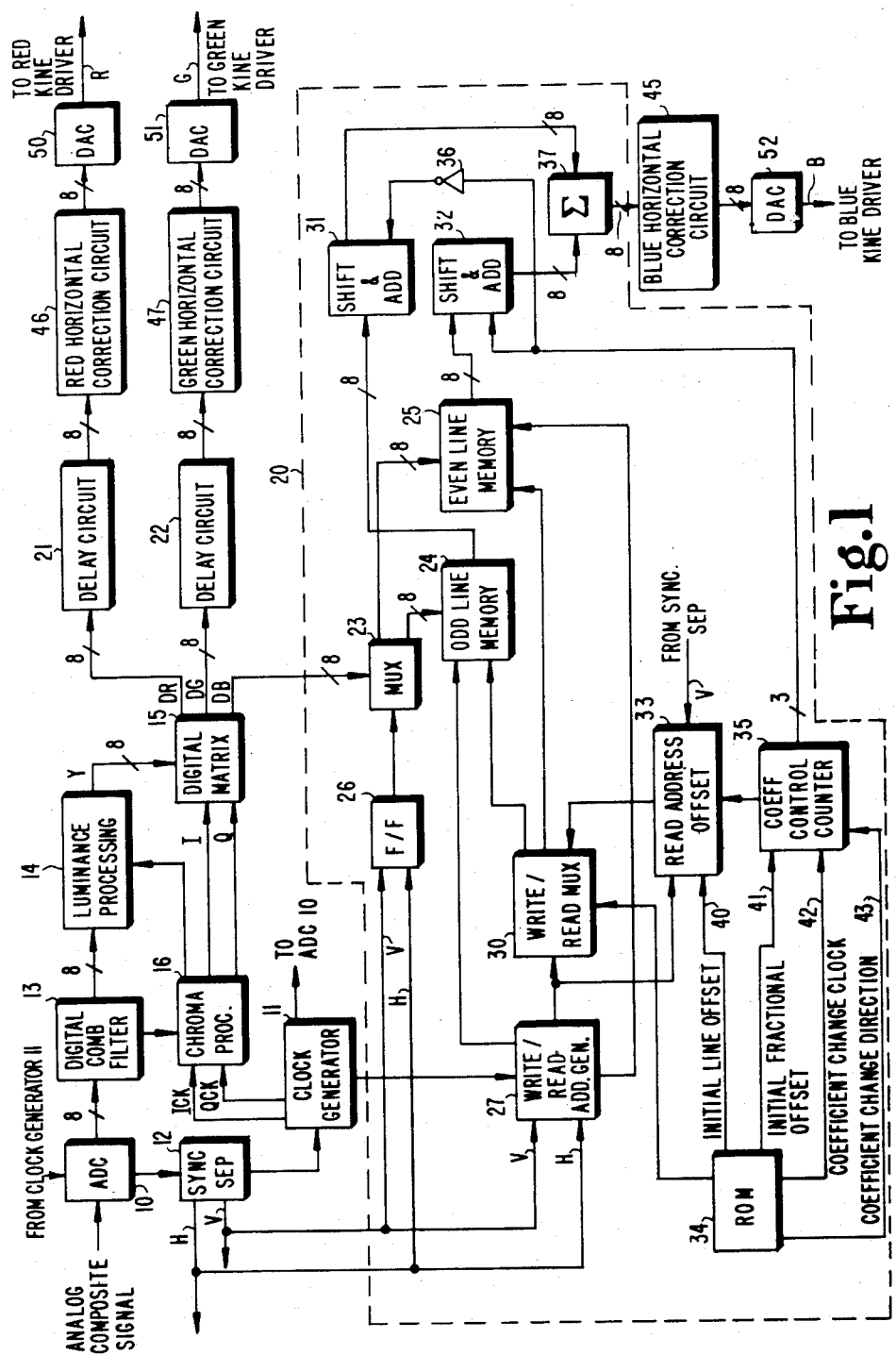

United States Patent [19]

Bolger

[11] Patent Number: 4,620,136
[45] Date of Patent: Oct. 28, 1986

[54] DIGITAL VERTICAL BEAM LANDING CORRECTION CIRCUIT

[75] Inventor: Thomas V. Bolger, Merchantville, N.J.

[73] Assignee: RCA Corporation, Princeton, N.J.

[21] Appl. No.: 676,141

[22] Filed: Nov. 29, 1984

[51] Int. Cl.$^4$ ............................................. H01J 29/56
[52] U.S. Cl. ..................................... 315/371; 315/368
[58] Field of Search ................................. 315/368, 371

[56] References Cited

U.S. PATENT DOCUMENTS 4,385,259  5/1983  Chase et al. ......................... 315/368
4,401,922  8/1983  Kamata et al. ....................... 315/368
4,422,019 12/1983  Meyer ................................. 315/368

Primary Examiner—Theodore M. Blum
Attorney, Agent, or Firm—Paul J. Rasmussen; Joseph Laks; Scott J. Stevens

[57] ABSTRACT

Circuitry corrects vertical beam landing errors for color cathode ray tubes. A digital delay circuit provides horizontal scan line video pixel information at its proper location to produce a distortion corrected raster. Accurate correction is provided by a combination of scan line offset between the input and output video signals and by sample interpolation techniques that effectively form derived pixels that have an apparent location of the derived pixel relative to the sample video pixels is determined by the selection of the interpolating coefficients.

6 Claims, 2 Drawing Figures

DIGITAL VERTICAL BEAM LANDING CORRECTION CIRCUIT

This invention relates to electron beam landing correction for cathode ray tubes and, in particular, to vertical convergence correction using digital sample interpolation techniques.

A digital color television system samples an analog video signal at a predetermined rate, for example, 14.32 MHz, which, for NTSC color signals, is four times the color subcarrier frequency. The signal amplitude of each sample is converted to a digital value by an analog-to-digital converter (ADC). The digitized video signal is processed to form red, green and blue drive signals which, after conversion back to the analog domain by a digital-to-analog converter (DAC), are applied to the cathodes of the color cathode ray tube.

Both digital and analog television receivers are subject to raster distortion and convergence errors. Horizontal convergence errors and raster distortion, such as side pincushion distortion, may be corrected by selectively delaying one or more of the individual color signals in a given horizontal scan line in order to converge the three colors on the cathode ray tube display screen. In a digital system, this delay may be accomplished by clocking the digital samples into a storage device, such as a random access memory (RAM) and clocking the samples out of the RAM after a predetermined number of clock pulses.

In order to provide accurate correction of misconvergence or raster distortion, it may be necessary to provide digital sample delays of less than whole clock pulses. One way such fractional clock pulse delays may be accomplished is by controlling the phase of the sample read clock with respect to the write clock, as is disclosed in U.S. patent application Ser. No. 480,907, filed Mar. 31, 1983 in the name of T. V. Bolger and entitled "DIGITAL VIDEO PROCESSING SYSTEM WITH RASTER DISTORTION CORRECTION". Another way of providing fractional sample delay is by a sample interpolation arrangement, such as is described in U.S. Pat. application Ser. No. 645,984, filed Aug. 31, 1984 in the name of T. V. Bolger and entitled "DIGITAL VIDEO DELAY BY SAMPLE INTERPOLATION".

Vertical misconvergence or vertical raster distortion, such as top and bottom pincushion distortion, requires a somewhat different correction approach than the previously described technique of horizontal error correction by sample delay. Whereas horizontal error correction requires processing of video information pixels in only a single horizontal scan line at a given time, vertical error correction requires simultaneous processing of pixels in more than one horizontal line, thereby increasing the complexity of the correction circuitry. Top and bottom pincushion distortion, for example, may result in information from one video line being displayed in several scan lines separated by a vertical distance on the picture tube display screen of as much as 1.2 cm. For a standard interlaced scan raster, this corresponds to a vertical distance of as many as eight horizontal scan lines. This means that for a severely distorted region of the raster, video information from as many as eight video lines must be retrieved in order to display one corrected picture line. It may also be necessary to be able to effect apparent displacement of video pixel information through distances less than the separation between scan lines, in order to provide accurate error correction to closely specified tolerances.

In accordance with the present invention, there is provided means for correcting vertical beam landing position errors in a video display apparatus comprising circuitry for digitally sampling a first line of video information to form a plurality of sample pixels and circuitry for digitally sampling at least another line of video information to form a plurality of sample pixels. Circuit means combines respective sample pixels from the first and the other lines of video information in accordance with the vertical beam landing position errors to form a resultant pixel having an apparent vertical offset position between the first and the other sample pixels that provides correction for the beam landing position errors.

Figure 2:
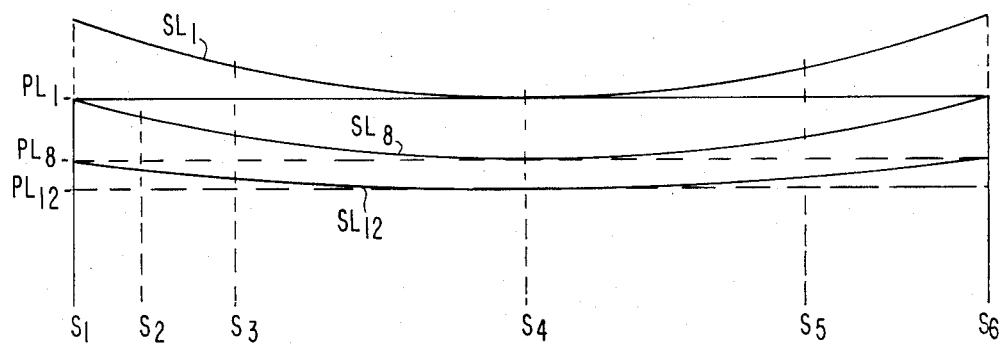

In the accompanying drawing,

FIG. 1 is a schematic and block diagram of a vertical beam landing correction circuit in accordance with an aspect of the present invention; and FIG. 2 shows a portion of a scanned raster, useful in understanding the circuit shown in FIG. 1.

Referring to FIG. 1, an analog composite video signal, from a source of video signals (not shown), is applied to an analog-to-digital converter (ADC) 10. ADC 10 generates digital samples or pixels at a sample rate determined by the clock signal frequency of a clock generator 11. The circuit of FIG. 1 illustratively uses a sampling frequency of 14.32 MHz, which is equal to four times the color subcarrier frequency for NTSC color signals. ADC 10 is illustratively shown as providing an 8-bit digital sample, thereby generating samples having $2^8 = 256$ possible quantizing steps. The digitized video signal is applied to a synchronizing separator circuit 12, where it is processed to remove the horizontal and vertical synchronizing information. The video signal is also applied to a digital comb filter 13, which separates the luminance and chrominance information into separate channels.

The luminance information is applied to luminance processing circuitry 14 which provides a luminance signal on a conductor designated Y to a digital matrix 15. Chrominance information is applied to chrominance processing circuitry 16, which generates the I and Q color signals in response to the properly phased I and Q clock signals, provided on conductors designated ICK and QCK from clock generator 11. The I and Q color signals, on conductors I and Q, are applied to digital matrix 15, which combines the luminance signal Y and the I and Q color signals to produce the digital red, green and blue color signals on conductors DR, DG and DB, respectively.

In accordance with an aspect of the present invention, each of the digital red, green and blue color signals is applied to a digital delay circuit. FIG. 1 shows, in detail, a digital delay circuit 20 which acts on the digital blue color signal on conductor DB. Similar delay circuits 21 and 22 for the digital red and digital green color signals are illustrated in block diagram form, for simplicity.

Digital matrix 15 generates digital color sample pixels illustratively comprising 8 bits. These samples are applied to an odd/even line multiplex circuit 23, which controls whether the digital pixels for a given horizontal scan line are stored in the odd line memory 24 or the even line memory 25. Memories 24 and 25, for example random access memories or RAM's, are provided so that pixels in successive video lines can be stored in different memories, thereby providing easy access to adjacent video line pixel information in order to simplify pixel processing. Multiplex circuit 23 receives a signal from a counter logic circuit such as flip-flop 26 that determines to which of memories 24 or 25 the video information pixels from digital matrix 15 are applied. Flip-flop 26 is responsive to horizontal synchronizing information and produces a signal which acts to switch the operation of multiplex circuit 23 for each horizontal video line in order to effectively direct the pixel data alternately into the odd line memory 24 and the even line memory 25. Flip-flop 26 is reset by vertical synchronizing information at the beginning of each field.

Write/read address generator 27 is reset by horizontal and vertical rate signals from sync separator 12 and incremented by clock generator 11. Write/read address generator 27 determines the pixel location in memories 24 and 25 into which pixel information is written or from which pixel information is read. Since vertical error correction requires processing pixels in adjacent video lines at the same horizontal raster position, the horizontal address provided by write/read address generator 27 will be the same at any given time for either a reading or a writing function. A write/read multiplexer circuit 30 determines which of the memories 24 or 25 will be reading data and which of the memories 24 or 25 will be writing data during a particular horizontal line interval. Pixel data being read from odd line memory 24 is processed by shift and add circuit 31, while data being read from even line memory 25 is processed by shift and add circuit 32. Shift and add circuits 31 and 32 perform coefficient multiplication as part of a sample interpolation function.

Referring to FIG. 2, the means by which vertical beam landing position errors are corrected will be described. FIG. 2 illustrates a number of representative horizontal scan lines near the top of the scanned raster. The scan lines display information from corresponding video lines. The scan lines illustratively exhibit north-south pincushion distortion.

As can be seen in FIG. 2, most of the first raster scan line $SL_1$, and corresponding video line $VL_1$ occurs above the top of the viewable display area, identified as picture line $PL_1$. Picture line $PL_1$ represents the location where scan line $SL_1$ would occur if no pincushion distortion existed. Due to the pincushion distortion of scan line $SL_1$, the only part of video line $VL_1$ that is viewable occurs near the center of the line. The first video line that is completely viewable in FIG. 2 is video line $VL_8$, displayed by scan line $SL_8$. Scan line $SL_8$ comprises one line of video information; however, due to the north-south pincushion raster distortion, scan line $SL_8$ traverses a vertical distance that includes picture lines $PL_1$–$PL_8$. For simplicity, only picture lines $PL_1$ and $PL_8$ are shown in FIG. 2. In accordance with an aspect of the present invention, in order to provide an apparent correction of the northsouth pincushion distortion, the video line information displayed by a given scan line is controlled so that the video information displayed at a given horizontal pixel location represents the information that would be displayed at the corresponding vertical picture line location of the beam, as if no pincushion distortion existed. For example, as scan line $SL_8$ traverses a vertical distance through picture lines $PL_1$ to $PL_8$ from the left side of the raster to the center (sample locations $S_1$–$S_4$), the video information displayed by the beam will correspond to video information derived from video lines $VL_1$ through $VL_8$, so that the resultant display appears to place the video line information at the desired picture line location.

In FIG. 1, read address offset circuitry 33 provides write/read multiplex circuit 30 with the initial coarse vertical offset for correcting a given horizontal scan line, i.e., the integer number of horizontal line intervals that are delayed between writing and reading of video data in order to place the video line information of a given scan line at the desired picture line location. For picture line $PL_8$ in FIG. 2, for example, the initial vertical offset at location $S_1$ provided by read address offset circuit 33 would be eight lines. This means that video information from video line $VL_1$ would be read and displayed at the beginning (left side of picture) of the scanning of scan line $SL_8$. As described previously, this will place the display of video information from the beginning of the first horizontal video line $VL_1$ at its desired location at the beginning of the first picture line $PL_1$. The initial offset needed during a given scan line is provided to read address offset circuit 33 from a read only memory (ROM) 34.

As scan line $SL_8$ progresses across the screen from sample locations $S_1$ to $S_6$ in FIG. 2, the video information needed to display a corrected raster at the appropriate picture line location must be derived from video lines $VL_1$ through $VL_8$. The vertical separation between horizontal picture lines provide beam landing correction in step amounts that are large compared to the incremental amount of distortion or beam landing error that must be corrected. Satisfactory distortion correction cannot be made, therefore, by only controlling the vertical offset position in integer units of horizontal video lines. Accurate beam landing position correction requires that video samples be derived that represent video information occuring between vertically adjacent sample pixels of adjacent video lines.

A horizontal beam landing correction arrangement utilizing a sample interpolation technique is disclosed in the afore-mentioned U.S. patent application Ser. No. 645,984, herein incorporated by reference. In an aspect of the present invention, a sample interpolation arrangement similar to that disclosed in U.S. patent application Ser. No. 645,984 is used to provide a derived sample pixel having a digital sample value interpolated between the sample values of pixels occuring in adjacent video lines.

As previously described, the initial integer line delay or offset for a given horizontal scan line necessary to place scan line video information at the proper picture line location is provided to read address offset circuit 33 by ROM 34 via the initial line offset conductor 40. The initial fractional line delay or offset is applied to coefficient control counter circuitry 35 by ROM 34 via the initial fractional offset conductor 41. The fractional line offset is combined with the integer line offset to provide accurate beam landing correction to the desired tolerances. The coarse integer and the fine fractional line delay or offset information provided by ROM 34 is determined during manufacture and alignment of the cathode ray tube and deflection yoke. A sensing arrangement, for example, a video camera or a number of photodiodes, determines the amount of correction required for each of the red, green and blue beams at different locations on the cathode ray tube display screen. This information is used to program ROM 34.

The fractional line delay information is provided in the form of coefficients that indicate the relative fractional amplitude of each of the two digital sample pixels from adjacent video lines that are used to form the resultant interpolated sample. The coefficients illustratively form unity fractional complements, that is, the sum of the coefficients will be one, or unity.

The formation of these unity fractional complements is simplified in a digital sampling system. The sample derived from the previously described sample interpolation technique has an apparent position located between the two original samples. The proximity of the interpolated sample to either of the two original samples is determined by the value of the coefficients. If the two interpolating coefficients are each chosen to be one-half, for example, the resultant derived sample will have an apparent position located halfway between the two real samples. If the two coefficients are chosen to be one-eighth and seven-eighths, for example, the resultant sample will have an apparent position located one-eighth of the distance between the samples measured from the sample on which the seven-eighth coefficient operates.

As previously described, the digital sample pixels from odd and even line memories 24 and 25 are applied to shift and add circuits 31 and 32, respectively, in response to signals from write/read multiplexer 30. Write/read address generator 27 determines which pixel location in a given video line is being read from the memories The two samples stored in shift and add circuits 31 and 32 will be from the same horizontal pixel location in adjacent lines, thereby forming vertically adjacent pixels.

The operation of shift and add circuits 31 and 32 is controlled by the fractional coefficients applied by coefficient control counter 35. A coefficient value is illustratively applied to shift and add circuit 32. An inverter 36 illustratively forms the unity fractional complement of the coefficient which in turn is applied to shift and add circuit 31. The coefficients control the number of bit shifts of the sample pixel information, thereby effectively multiplying the sample value by the coefficient. The resultant bit-shifted samples are applied to a summing circuit 37, which sums the samples and provides an interpolated sample at its output. The interpolated sample for the blue video signal may be illustratively applied to a horizontal error correction circuit 45, such as is described in the afore-mentioned U.S. patent application Ser. No. 645,984, or in an article entitled "Digital System for Horizontal Geometry and Convergen Correction", by R. Deubert, published in the IEEE Transaction on Consumer Electronics Vol.CE-30, No. 3, August, 1984, which describe a sample interpolation technique which corrects for horizontal beam landing position errors. Alternative techniques for horizontal beam landing error correction are described in the afore-mentioned U.S. patent application Ser. No. 480,907, and in U.S. Pat. No. 3,893,174, issued July 1, 1975 in the names of Sano et al. The red and green video signals are illustratively applied to red horizontal correction circuit 46 and green horizontal correction circuit 47, respectively. The respective red, green and blue corrected digital signals are applied to digital to analog converters 50, 51, and 52, respectively, which convert the signals back into the analog domain. The red, green and blue analog signals are then illustratively applied to their respective kine driver circuits.

As the electron beams traverse the screen a given horizontal scan line, ROM 34 will provide information that determines when the fractional coefficients should be incremented or decremented to maintain proper display of the correct video information at the proper picture line locations. The signal which indicates a coefficient change occurrence is provided to coefficient control counter 35 via coefficient change clock conductor 42. The coefficient change direction is provided to coefficient control counter 35 via coefficient change direction conductor 43. A signal from coefficient control counter 35 to read address offset 33 causes the selected video lines to be advanced or retarded when the coefficients are respectively incremented or decremented through unity.

Since the delay circuits 20, 21 and 22 operate independently on the red, green and blue designated electron beams, it is possible to correct any vertical beam landing error, such as convergence, coma, vertical height and top and bottom pincushion distortion, for example.

For a normal interlaced scan at a standard horizontal broadcast frequency of 15.75 KHz, a vertical error of ±0.5 inch on a 25V cathode ray rube could be corrected using eight-line (8H) memories for memories 24 and 25. In progressive scan system operating at a horizontal deflection frequency of 31.5 KHz, a similar amount of correction would require sixteen-line (16H) memories, since the vertical distance between adjacent scan and picture lines would be halved.

Alternately, if a field or frame store progressive scanning system were to be used, odd and even line memories 24 and 25 would be incorporated into the field or frame store architecture. Similarly, if sample interpolation techniques were to be used to correct horizontal beam landing errors, a common memory and addressing system could be provided.

What is claimed is:

1. Apparatus for correcting a vertical beam landing position error in a cathode ray tube for a video information pixel comprising:
    means for providing the correct vertical raster location for said video information pixel;
    means responsive to said location providing means for providing a first amount of vertical beam landing position error correction for said video information pixel equal to the number of integer video scan lines of correction required;
    means for digitally sampling first and second lines of video information to provide a plurality of sample pixels from each of said first and second lines of video information;
    means responsive to said location providing means for combining sample pixels from said first and said second lines of video information to provide a second amount of vertical beam landing position error correction for said video information pixel equal to the fractional line amount of correction required.

2. The arrangement defined in claim 1, wherein said means for providing the correct raster location for said video information pixel comprises a preprogrammed memory.

3. The arrangement defined in claim 1, wherein said means for providing a first amount of beam landing position error correction comprises means for delaying the display of said video information pixel for a period equal to a predetermined number of lines of video information.

4. In a cathode ray tube producing three electron beams and exhibiting vertical beam landing errors of said electron beams on the display screen of said cathode ray tube, apparatus for each of said three electron beams for correcting said vertical beam landing errors for a video information pixel, said apparatus comprising:

means for providing the correct vertical raster location for said video information pixel;

means responsive to said location providing means for providing a first amount of vertical beam landing error correction for said video information pixel equal to the number of integer lines of correction required;

means for digitally sampling first and second lines of video information to provide a plurality of sample pixels from each of said first and second lines of video information;

means responsive to said location providing means for combining sample pixels from said first and said second lines of video information to provide a second amount of vertical beam landing error correction for said video information pixel equal to the fractional line amount of correction required.

5. In a cathode ray tube production three electron beams and exhibiting beam landing errors of said three electron beams on the display screen of said cathode ray tube, means for correcting said beam landing errors for each of said three electron beams for digital video information pixels in a first digitally sampled line of video information comprising:

means for providing the correct raster location for one of said digital video information pixels for each of said three electron beams;

means responsive to said location providing means for providing a first amount of vertical electron beam landing error correction equal to the integer number of lines of correction needed for said one of said digital video information pixels;

means for digitally sampling at least another line of video information to provide a plurality of digital video information pixels;

means responsive to said location providing means, and including means for combining digital video information pixels from two lines of video information, for providing a second amount of vertical electron beam landing error correction equal to the fraction line amount of correction needed for said digital video information pixel from said first digitally sampled line of video information in order to provide a line of vertically corrected digital video information pixels;

means responsive to said location providing means for providing horizontal electron beam landing error correction for said line of vertically corrected digital information pixels.

6. The arrangement defined in claim 5, wherein said means for providing horizontal electron beam landing error correction comprises means for combining digital video information pixels from said line of vertically corrected digital video information pixels.

* * * * *

UNITED STATES PATENT AND TRADEMARK OFFICE
CERTIFICATE OF CORRECTION

PATENT NO. : 4,620,136

DATED : 10/28/86

INVENTOR(S) : Thomas Vincent Bolger

It is certified that error appears in the above-identified patent and that said Letters Patent is hereby corrected as shown below:

On the Title Sheet, under [57] ABSTRACT, after "apparent location" and before "of" insert -- that corrects the scanning distortions. The location --

Signed and Sealed this

Fourteenth Day of April, 1987

Attest:

DONALD J. QUIGG

*Attesting Officer*     *Commissioner of Patents and Trademarks*